March 24, 1970 R. H. SCHWAAR ET AL 3,502,633
POLYMERIZATION PROCESS
Original Filed June 2, 1961 4 Sheets-Sheet 1

INVENTORS:
ROBERT H. SCHWAAR
E. GORDON FOSTER
BY: *Harold Shaw*
THEIR ATTORNEY

March 24, 1970   R. H. SCHWAAR ET AL   3,502,633
POLYMERIZATION PROCESS

Original Filed June 2, 1961   4 Sheets-Sheet 3

INVENTORS:
ROBERT H. SCHWAAR
E. GORDON FOSTER
BY: *Harold Shain*
THEIR ATTORNEY

INVENTORS:
ROBERT H. SCHWAAR
E. GORDON FOSTER

BY: *Harold Shain*

THEIR ATTORNEY

# United States Patent Office 3,502,633
Patented Mar. 24, 1970

3,502,633
POLYMERIZATION PROCESS
Robert H. Schwaar and E. Gordon Foster, Berkeley, Calif., assignors to Shell Oil Company, New York, N.Y., a corporation of Delaware
Continuation of application Ser. No. 116,653, June 2, 1961. This application May 31, 1966, Ser. No. 554,213
Int. Cl. C08f 3/10
U.S. Cl. 260—93.7
10 Claims

ABSTRACT OF THE DISCLOSURE

A continuous process for the polymerization of alpha-monoolefins, particularly, propylene, comprises an integrated sequence of processing steps. Monomer is polymerized in liquid phase in a low-boiling diluent by contact with a Ziegler-type catalyst to produce a polymer which is insoluble in the reaction mixture. A portion of the reaction slurry is continuously withdrawn, treated to deactivate the catalyst, washed to remove catalyst residues and subjected to evaporative separation of volatile components of the slurry from the polymer. The process is characterized, inter alia, by the absence of the usual step of separating freshly produced polymer from the reaction liquid, and by the maintenance of pressure from the reaction step through the drying step.

---

This application is a continuation of Ser. No. 116,653, filed June 2, 1961, now abandoned, which is a continuation-in-part of Ser. No. 780,985, filed Dec. 17, 1958, now abandoned.

This invention relates to the low pressure polymerization of olefins. More particularly it relates to a fully integrated, continuous process for the low pressure polymerization of alpha-monoolefins, particularly propylene, to produce the crystalline forms thereof.

It is now known that alpha-monoolefins may be polymerized at low temperatures and low pressures to produce polymer which is linear in structure. The methods for such polymerization are generically referred to as "low-pressure" methods and the polymer thus produced is termed "crystalline," "low pressure" or "linear" polymer.

In the interest of simplicity and clarity the description of the invention, for the most part, will be confined to a discussion of propylene polymerization using preferred catalysts and selected modifications of apparatus and processing conditions. The invention is not confined to such descriptive matter, as will be understood by persons skilled in the art.

It is an object of this invention to provide a continuous process for the low-pressure polymerization of alpha-monoolefins. It is another object of this invention to provide a process for the low-pressure polymerization of propylene wherein each operation in the process is fully integrated and controlled so as to produce maximum efficiency in operation. It is another object of this invention to provide a continuous process for the polymerization of propylene wherein the processing conditions may be varied as required, depending upon the nature of the polymer to be produced. Other objects will become apparent as the description of the invention proceeds.

In one embodiment, the polymerization of alpha-monoolefins for the production of crystalline or linear polymer is accomplished by the steps, in combination, comprising polymerizing a mixture of olefin, catalyst, and inert diluent, the mixture being substantially free of air and water, the catalyst being prepared by mixing a compound of a metal of Groups IV to VI of the Periodic Table and an organometallic compound of a metal of Groups I to III of the Periodic Table, the polymerization being at temperatures ranging from 90° F. to about 200° F., cooling the polymerization mixture during the polymerization, continuously removing from the reaction zone a polymer slurry in hydrocarbon diluent, mixing the polymer slurry with a lower alcohol at elevated temperatures whereby the catalyst residues are decomposed, washing the thus prepared slurry with an aqueous solution of mineral acid, separating the polymer as a slurry and subjecting it to at least one washing with an aqueous base, and spray drying the polymer slurry.

This invention provides a fully integrated process for the polymerization of an alpha-monoolefin such as propylene, using a low-pressure catalyst system of the type described above, whereby the numerous difficulties are overcome which exist in batch process and continuous process low-pressure polymerizations as known heretofore. The difficulties and complexities may be illustrated, for example, by a simple consideration of the polymer itself. Thus it is known that the molecular weight of the polymer may be controlled to some extent by the proportion of the various ingredients contained in the catalyst composition. The catalyst composition can also affect the crystallinity of the polymer, the polymerization rate and the molecular weight of the product. Further, the polymer is affected by the degree of purity of the monomer, catalyst, diluent and the like. All these in turn may have some effect upon the quantity of the catalyst residues which remain in the final product even after the polymer has been treated to remove as much residue as possible. The presence of catalyst residues in the polymer affects the stability of the polymer, which has an important bearing on its subsequent utility in commercial applications. Further, temperatures and pressures are important considerations throughout the processing because of the effect on molecular weight, crystallinity, rate of polymerization and purity of the polymer. In addition, considerable difficulty may be experienced in the initial polymerization by reason of adhesion of the polymer to the inner surfaces of the polymerization vessel or in the transfer lines which are involved in continuous processes. This phenomenon is called "surface fouling." Additionally, the polymerization of polypropylene by low-pressure methods is characterized by a high exotherm which coacts with the surface fouling effect in such a way that the initial polymerization step is accompanied by a substantial heat transfer problem. The operation of a smooth continuous process for the polymerization of propylene by low-pressure methods is one which heretofore involved numerous problems which this invention overcomes.

In order to facilitate a consideration of the present invention, the process may be regarded as comprising three essential operations which for the sake of convenience are designed as (1) polymerization and catalyst decomposition, (2) catalyst residue removal and (3) polymer recovery. It will be understood however that the three operations cannot be regarded as separate entities because of the interdependence of all the essential processing steps. In addition to the operations described above the integrated process requires other units in order to make the process both feasible and economic. Such units may be considered as being conventional and are not shown in the drawings or described in detail in the present description. However, their importance and relation to the integrated process are indicated wherever appropriate.

The polymerization operation comprises essentially a polymerization zone wherein the initial polymerization is conducted. A single continuous reactor may be used or two or more reactors may be connected and operated in series. The polymerizations are exothermic and some cooling is provided during the polymerization in order to maintain a uniform polymerization temperature. The cooling may be accomplished by the use of cooling jackets but it is preferred to use evaporative cooling as such cooling permits greater uniformity of temperature within the reactor and minimizes the effect of surface fouling on reactor operation. After the polymerization step, the polymer is treated to deactivate the catalyst. This is achieved by withdrawing polymer slurry from the reactor and treating it in a separate vessel with polar liquids that react with and thus deactivate the catalyst.

After the polymer slurry has been treated to decompose the catalyst a series of operations may be performed which are designed to separate the deactivated catalyst residues from the polymer. It will hereinafter appear that some of the operations in the catalyst residue removal step are optional depending upon the quantity of residue present, which in turn will vary according to the amount of catalyst used, the nature of the catalyst, and the like. Thus, for example, if an effective and substantially complete catalyst residue removal is accomplished initially, or with minor treatment, then further treatment of the polymer to further reduce the residues may become unnecessary.

The final steps of polymer recovery comprise removing water, residual gases, unreacted monomer, diluent and the like from the polymer. For this integrated continuous process a spray dryer is suitably used, or any other dryer in which all liquid associated with the polymer is removed by evaporation, preferably at no substantial decrease in pressure. These will be referred to as evaporative dryers; a spray dryer is a typical example thereof.

The low-pressure polymer is produced by employing any of a variety of catalysts. Suitable catalysts are represented by those that are prepared from at least two components within groups A and B as follows:

(A) The reaction product of (1) a compound of a metal selected from Groups IV, V, VI and VIII of the Periodic Table and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan, thiophenol, carboxylic acid and sulfonic acid.

(B) The reaction product of (1) a compound of a metal from Groups IV, V, VI and VIII of the Periodic Table and manganese with (2) a compound selected from the group consisting of aluminum trialkyl, magnesium alkyl, zinc alkyl and Grignard compound.

Stated more broadly, the low-pressure catalysts are generally said to include the reaction product of a Group IV, V, VI or VIII metal compound, often referred to as a transition metal compound, and a reducing agent.

In this invention, the catalyst is preferably of the type generally referred to as Ziegler type or Natta type. The former may also be designated "metal alkyl-reducible metal halide type" and the latter "preformed metal subhalide type." This terminology is used for example, in "Polyolefin Processes Today" by Marshall Sittig, Petroleum Refiner, vol. 39, No. 11, pp. 162–222 (1960). These catalysts are the reaction products of halides, in order of preference chlorides and bromides, of transition metal from subgroups B of Groups IV and V of the Periodic Table, i.e. of Ti, Zr, Hf, Tl, V, Nb or Ta, with organometallic reducing agents in which the metal is from Group I, II or III of the Periodic Table. Preferred reducing agents are aluminum alkyls.

All the catalysts which are operable for the low pressure polymerization processes are not equally suitable. A certain few catalyst compositions are particularly suitable in the low-pressure methods because they produce high yields of polymer which have higher proportions of crystallinity in addition to which the molecular weight may be controlled as desired.

In the preferred embodiment the catalysts for the purpose of this invention are selected from the reaction product of a Group IV metal halide such as zirconium trichloride, titanium trichloride and the like and an aluminum dialkyl halide or aluminum trialkyl, or mixtures thereof, with the last being more preferred. Representative aluminum alkyls include, for example, aluminum diethyl chloride, aluminum diethyl bromide, aluminum triethyl, aluminum triisobutyl, aluminum triisopropyl, aluminum trinonyl, and others wherein the alkyl radicals have from 1 to 10 carbon atoms.

In a particularly preferred embodiment, in the polymerization of propylene, the catalyst is that described in U.S. 2,971,925 to Winkler et al.

This invention is advantageous for the continuous production of polymers of various alpha-monoolefins. It is important that the monomer, catalyst, diluent if any, and conditions be selected such that the polymer is completely insoluble in the reaction mixture throughout the processing sequence. This condition obtains in general in the polymerization of ethylene, propylene, butene-1,3,3-dimethylpentene-1 and various other monomers of up to about 8 carbon atoms per molecule. The invention is also suitable for use in the modified polymerization of alpha-monoolefins in which a small amount of a comonomer is included, but not sufficient to produce a rubbery, hydrocarbon soluble copolymer. For example, the block polymerization of U.S. Ser. No. 77,776, filed Dec. 22, 1960 by G. A. Short, now abandoned, is suitably carried out according to this invention, preferably by use of two reactors.

Diluent and reaction conditions are selected to maintain the desired reaction and to maintain the polyolefin completely undissolved. For example, paraffinic hydrocarbons of 3 to 6 carbon atoms are generally useful in polymerization of propylene or ethylene. In the polymerization of butene-1, the diluent is preferably a $C_3$ to $C_4$ hydrocarbon and the temperature is maintained relatively low because poly(butene-1) softens at a relatively low temperature.

Figure 1:
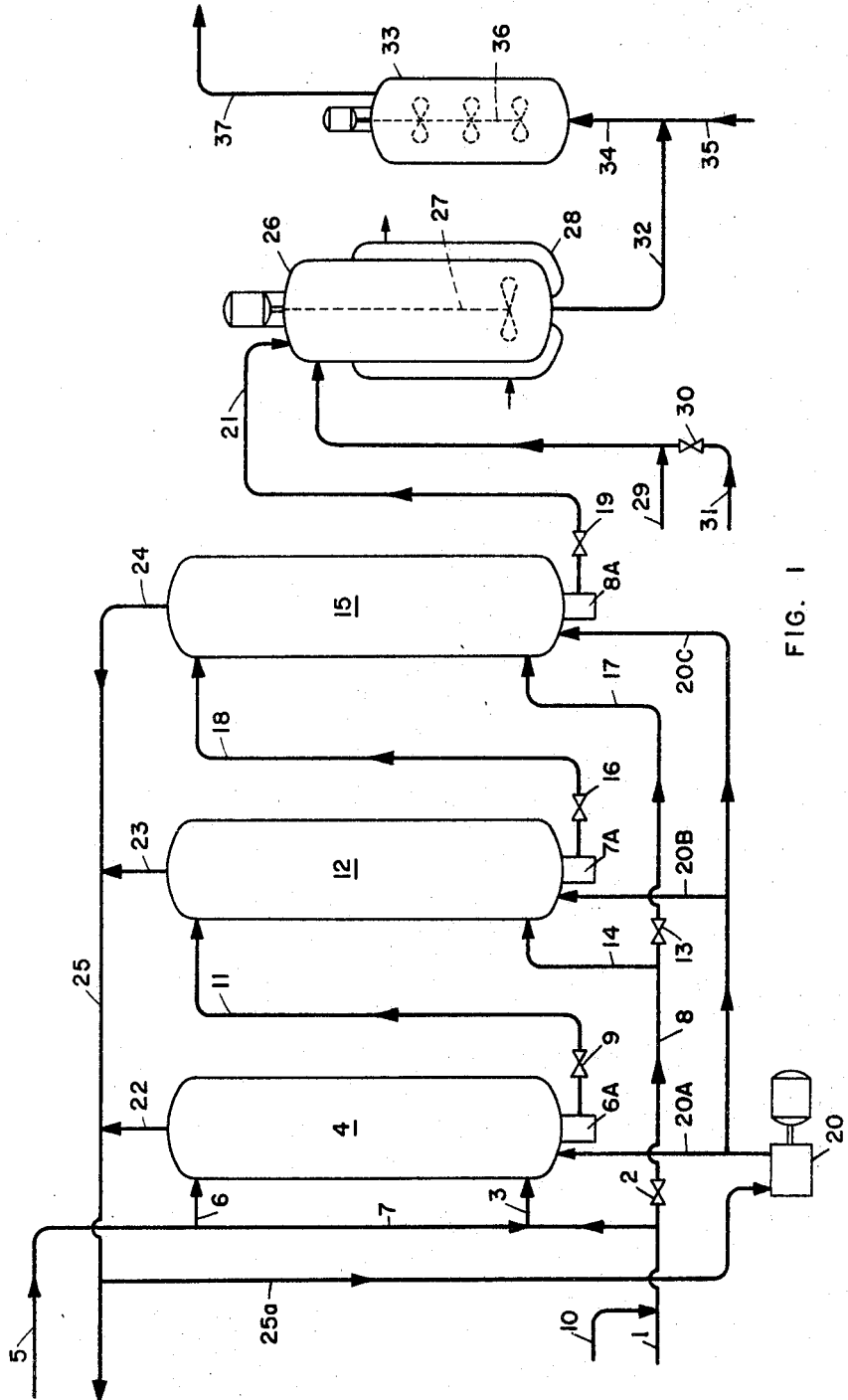
FIG. 1 is a diagrammatic representation of the polymerization and catalyst decompositions operations in one embodiment of this invention.

Referring to FIG. 1, propylene, usually mixed with a low-boiling liquid hydrocarbon diluent such as propane, butane, pentane, or hexane enters the system from line 1. The low boiling liquid hydrocarbon is sometimes designated "solvent" because the feed is soluble in it, but it is preferably known as "diluent." The mixture of the propylene with the low-boiling hydrocarbon diluent may be carried out in a reactor 4 or by any other means in a unit (not shown) wherein a treatment may take place in order to dry the propylene, separate moisture and other impurities, and pump the mixture into line 1. At the start of the operation the valves 2, 9, 13, 16 and 19 will be closed and the feed passes through line 3 to the polymerization reactor 4. While the reactor 4 is being filled with the propylene feed, catalyst is fed into the reactor 4 from line 5 through 6. The catalyst is previously prepared in any conventional unit (not shown) before entering line 5. If desired part or all of the catalyst may be fed through line 7 to join the propylene feed in line 3. This has the advantage that a small amount of catalyst will deactivate last traces of impurities, if they are present. Alternatively, last traces of impurities may be deactivated by treatment with sodium but excess sodium does not enter the polymerization reactor. Alternatively, catalyst components may be contained in lines 5 and 10, and in the latter case only one component may be mixed with the incoming feed.

As reactor 4 is filled, a valve (not shown) in line 22 is open and when the level of the liquid content within reactor 4 is reached, which is below the inlet of line 6, valve 2 is opened and feed stream is divided into two parts—one portion going to reactor 4 and the other going to reactor 12. At the time valve 2 is opened valve 9 is also opened so that the contents of the reactor 4 will begin to pass through line 11 into the reactor 12. At this time valves 13 and 16 are closed so that reactor 12 is being fed from lines 11 and 14. The feed from line 11 comprises polymer slurry which was formed in reactor 4.

In one preferred embodiment of the polymerization operation, at least two reactors are employed and preferably more. The ultimate number of polymerizers depends mainly on the desired capacity of the plant and in the most preferred embodiment of multiple reactors, at least three reactors as 4 and 12, are employed, and for the purpose of this description three reactors are shown in FIG. 1, the third reactor being 15. To place the three reactors in operation the procedures described above in relation to reactors 4 and 12 are repeated, i.e., when the contents of reactor 12 have reached the desired level, valves 13 and 16 are opened causing propylene feed to enter reactor 15 through line 17 and polymer slurry to enter the reactor 15 through line 18.

It will be observed that catalyst enters the system only in the first reactor 4. By this means polymerization commences in reactor 4 when the catalyst and the monomer come in contact and polymerization continues in reactors 4, 12 and 15. The polymerization, though started in reactor 4, is continued in reactors 12 and 15 by the addition of the propylene in lines 14 and 17, respectively, to the growing polymer chains. When the contents of reactor 15 have reached the desired level, which is below the feed port of line 18, the valve 19 is opened and the polymer slurry passes through line 21 to the catalyst decomposition operations.

Referring again to FIG. 1, the lines 22, 23 and 24 at the top of reactors 4, 12 and 15, respectively, are vent lines whereby vented gases are removed from their respective reactor through line 25. In this way most of the required cooling is achieved, i.e., by the evaporation of diluent, propene and unreacted propylene. The off-gases may be conveyed to a recovery unit (not shown) where they may be prepared for reuse. The reactors 4, 12 and 15 may be equipped with means for stirring their contents as with agitators (not shown). In the more preferred embodiments, stirring is accomplished by recycling a portion of the off-gases from line 25 to the bottom regions of each of the polymerization vessels in the system. This may be accomplished by passing the portion of the off-gases in line 25a through a blower or compressor 20 and then distributing the compressed gases to the bottom regions of each of the vessels in the system through lines 20a, 20b and 20c, respectively. Alternatively gases may be fed to the blower 20 from other sources (not shown) rather than recirculating a portion of the off-gases in line 25a. In this connection, the recirculation of a portion of the off-gases primarily is for agitation but it also provides additional monomer to the system. Thus, if desired, gases other than recycle gases may be employed to effect the agitation. Such gases include, for example, nitrogen, methane, ethane, or any other inert gas. The use of gas agitation, instead of mechanical agitation, has the major advantage that mechanical seals and moving parts in the reactors 4, 12 and 15 are avoided. If desired the reactors 4, 12, and 15 may be equipped with external cooling jackets (not shown) but the use of external cooling normally will not be required. When all three reactors are in operation steady-state conditions will gradually be approached and finally come into being so that the temperatures within each reactor will be about constant and be substantially the same. Operation using a single reactor is illustrated below with reference to FIG. 4.

The slurries which are withdrawn from each of the reactors 4, 12 and 15 will normally be fine slurries and the concentrations of each will depend largely on the degree of polymerization that is achieved in each reactor. In any case the slurry withdrawn from reactor 15 by line 21 should be less than about 35% solids, by weight. If it is higher pumping of the slurry becomes difficult. The slurries withdrawn from reactors 12 and 4 will be less, respectively, and will depend on the degree of polymerization achieved in each reactor. When the same conditions of temperature exist in each reactor one-third of the total solids withdrawn at 21 is produced in each reactor. It is most economical to operate with maximum solids being withdrawn from reactor 15. However, the solids may be as low as 5% by weight but this will require higher processing costs to recover the solvent. Each of the reactors 4, 12 and 15 may be equipped at the bottom with disintegrators 6A, 7A and 8A, respectively, which will assure that the solids of the slurry are divided into fine particles and thereby avoid clogging of transfer lines.

The propylene feed stream entering at 1 is under pressure ranging from about 50 p.s.i.a. to about 1000 p.s.i.a., with pressure in the order of about 200 to 300 p.s.i.a. being preferred. The cost of the reactors 4, 12 and 15 become proportionally higher in order to withstand the higher pressures and generally pressures in excess of about 500 p.s.i.a. are not needed unless higher polymerization temperatures are employed. As previously indicated the heat supplied to the reactors 4, 12 and 15 generally is due to the exotherm developed during the polymerization. In some measure this will depend upon the catalyst choice and the total heat generated will depend upon the relative activities of the catalyst chosen. In general temperatures in the order of 100° F. are suitable. Temperatures in the order of about 185° F. can be obtained with one of the preferred catalysts. The propylene feed stream entering the system at 1 may be made up to contain any desired proportion of monomer and diluent. For example, the feed stream may contain from about 5 to about 50 mole percent or even up to 100 mole percent of propylene, with at least 15% being preferred. In one modification, the liquid in the feed stream and the reactor consists essentially completely of propylene, which then serves as reactant, diluent, and evaporative coolant. In another modification the liquid in the feed stream and in the reactor consists of only propylene and propane. Propane will usually be present in such feeds in substantially larger proportion than propylene to provide dilution and adequate cooling; it may conveniently range from 30 to 90 mole percent of the total or even to 95 mole percent, with about 40 mole percent being representative of a preferred amount. Feeds containing amounts of propane ranging from 0 to 30 mole percent may be used. Other low boiling liquid diluents may be present and may range from 0 to 60 mole percent with concentrations of the order of about 50 mole percent being suitable to provide smooth transfer of slurry in the lines and assist in the cooling. The feed stream may also contain various additives that have particular functions relating to the control of the polymer quality. Such additives may have the effect of lowering or raising the molecular weight of the polymer and include, for example, hydrogen, acetylene, ethers, esters, amines and other compounds having active hydrogen atoms. The need or desirability for such additives varies a great deal and depends mainly on the catalyst choice and generally they are not essential. However, they can be used advantageously at times; in the case of propylene polymerization hydrogen is particularly useful. Compounds having active hydrogen, particularly acetylene, are better for ethylene polymerizations. Acetylene is preferably removed completely from feed to propylene polymerization.

Referring again to FIG. 1, the polymer slurry withdrawn from reactor 15 by line 21 is fed into a vessel 26 for catalyst decomposition. The vessel may be equipped with agitator 27 and a cooling jacket 28. To the vessel 26 is continuously added a polar organic liquid that reacts with the catalyst contained in admixture in the polymer slurry. Such polar organic liquids are fed through line 29 from a storage tank (not shown). The polar liquids may be methanol, ethanol, propanol, isopropanol, butanol, or the like, with the lower alcohols as ethanol or isopropanol being preferred. A strong mineral acid, as hydrochloric acid, may also be fed into the vessel 26 by line 31. In the more preferred embodiments, anhydrous mineral acid is added at 31 and at a later stage as will be described hereinafter. The polar liquids used to decompose the catalyst preferably are free of water and accordingly the lower alcohols and mineral acid, if used, are anhydrous or substantially anhydrous.

While the polymer slurry is being treated with the polar liquid, as ethanol, cooling or heating may be applied as required through heat exchange jacket 28 so that, in general, the temperature within the decomposer 26 will be in the order of about 120–160° F. with about 140° F. being suggested. The polymer slurry, which is now intimately mixed with the polar liquid, is continuously withdrawn by line 32 and treatment with aqueous mineral acid may take place at this point, in an acid wash vessel 33. Aqueous mineral acid, as hydrochloric acid, is fed by line 35 to the wash vessel 33 via line 34 from a storage tank (not shown). It will be seen from a consideration of vessels 26 and 33 that the acid wash vessel 33 is required in one preferred embodiment but, as previously indicated, one may eliminate the anhydrous mineral acid coming in from line 31 and, in its place, add the acid by line 35, which acid may be dilute hydrochloric acid containing, for example, in the order of 0.22% by weight of hydrogen chloride. The vessel 33 preferably is equipped with an agitator 36 that will provide intimate mixing between the polymer-alcohol-diluent slurry and the mineral acid and for this purpose multiple blades on the agitator 36 are useful.

The catalyst decomposition treatment, which comprises the units 26 and 33, with the latter being optional but preferred, does not require careful temperature control although the contents of vessels 26 and 33 will be at elevated temperatures. It will be observed however that the entire system is under elevated pressures in the order of that previously described. The pressures are maintained by the use of suitable pumps (not shown) in lines 1, 5, 8, 11, 18, 21, 29 and 35 and if line 31 is to be used then a pump (not shown) will be required in that line. The off-take product from vessel 33 comprises a mixture of solid polymer, polar liquid as alcohol, acid, diluent and catalyst residues. Additionally, the mixture may contain small amounts of residual gases including unreacted propylene, propane and vaporized solvent. The off-take mixture is fed through line 37 to that portion of the process that is concerned with removal of catalyst residues and is generally shown in FIG. 2.

Figure 2:
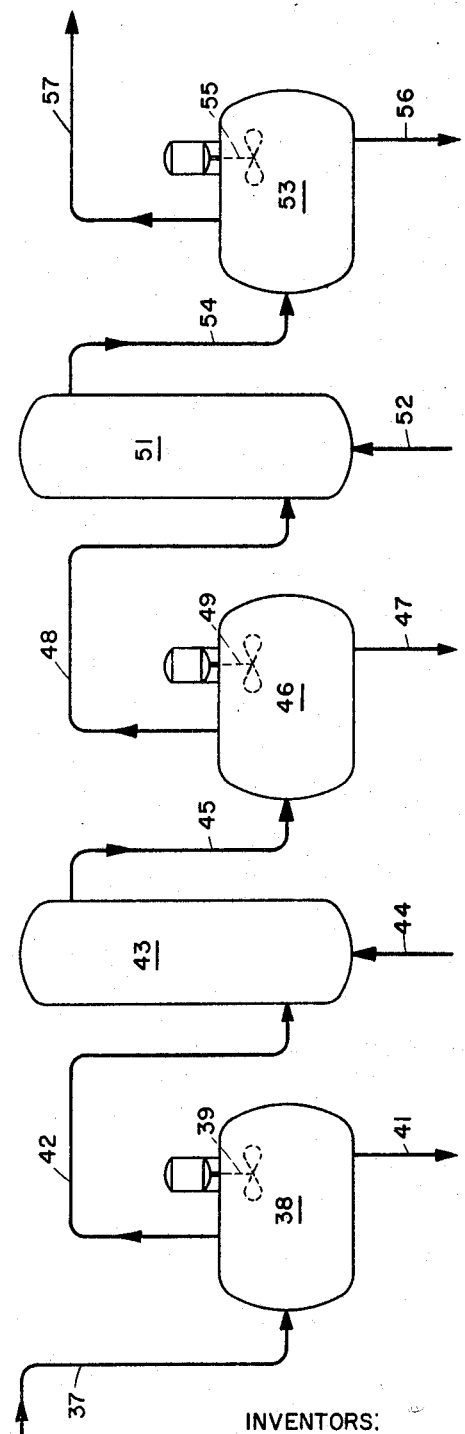
FIG. 2 is a diagrammatic representation of the operations concerned with removal of catalyst residues in the same embodiment.

Referring to FIG. 2, the mixture described above enters a settler 38 from line 37 where the incoming mixture is separated into two layers. The upper layer comprises the polymer as a slurry in the solvent and the lower layer in the preferred method of operation is an aqueous phase comprising spent mineral acid, alcohol and most of the catalyst residues. The settler is shown in the drawing as being equipped with an agitator 39 which rotates gently in the upper layer only so as to maintain the solid polymer in suspension in the upper layer. If desired, the settler 38 may contain a partial baffle (not shown) at the interface of the two levels to aid phase separation. The aqueous phase which is at the bottom of the settler 38 is removed from line 41 where it may be discarded, treated to recover the alcohol and acid or recirculated, in part, to line 35. The upper polymer slurry layer within the settler 38 passes through line 42 to a wash vessel 43 for further treatment of the polymer.

Water enters the wash vessel 43 through line 44 for mixing with the polymer. The vessel 43 may be equipped with an agitator (not shown) to obtain intimate and efficient agitation in the wash vessel 43. This unit serves principally to remove residual acid and some more catalyst residues that may be occluded in the polymer particles. The wash water entering through line 44 preferably is at elevated temperatures ranging from about 50° F. to about 200° F. with temperatures of about 150° F. being preferable in one modification and 130° F. in another. At this stage the system is still preferably under about the same pressure used in the reaction zone. The mixture that is removed from the wash vessel 43 now comprises diluent, polymer, water, small amounts of residual acid, small amounts of catalyst residue, unreacted monomer, propane and other gases, as vaporized diluent. This mixture passes through line 45 to another settler 46 which may be of similar design and construction as settler 38.

In the settler 46 the incoming mixture is again divided into two layers with the bottom layer being mainly water, a small amount of residual acid and some catalyst residue; the upper layer is a diluent layer containing solid polymer, very small amounts of catalyst residues, and gases. The lower layer is discarded from line 47 and the polymer slurry is sent out of the settler 46 through line 48. The temperatures and pressures within the settler 46 may be of the same order as that within the settler 38.

The polymer slurry then enters another wash vessel 51 which functions primarily to neutralize the last traces of acid that may be present in the polymer. This is accomplished by feeding an aqueous base through line 52 where it is intimately mixed with the polymer slurry by agitation (not shown) or other suitable mixing means. The temperature of the aqueous base in one modification preferably is in the order of about 200° F. while 130° F. is preferred in another; temperatures as low as 60° F. may be employed. The aqueous base may be any base that will neutralize the acid and includes, for example aqueous sodium hydroxide, potassium hydroxide, lime, calcium stearate, amines, as ethanolamine, and the like and for the purpose of this description sodium carbonate is employed. The mixture in vessel 51 then passes to another settler 53 by line 54.

The settler 53 may be of the same design and construction as the settlers 38 and 46 whereby the aqueous layer, containing spent aqueous base, is discarded through line 56. It may have an agitator 55 and partial baffles (not shown). The polymer-containing slurry leaves the settler 53 through line 57. As in the preceding units the pressure in settler 53 preferably is in the order of about 200–300 p.s.i.a. and the temperature also is preferably elevated.

The processing steps shown in FIG. 2 are capable of numerous modifications particularly in the type of apparatus employed and in their respective numbers. Thus, for example, it will be appreciated that if desired additional wash steps may be inserted by merely adding more wash vessels and settlers. Conversely, depending upon the thoroughness of the acid separation in the vessel 38 the wash step in washer 43 and the settling step in settler 46 may be eliminated in which event line 42 would be connected directly to the washer 51. FIG. 2 represents a preferred embodiment of carrying out the invention and shows two separate washings in vessels 43 and 51 with three settling steps in vessels 38, 46 and 53. The settlers are shown by one type of apparatus although it will be appreciated that other types of settlers may be employed. Other modifications which may be adopted include, for example, the use of various chemicals which function to complex the small amounts of catalyst residues that may be present. Such complexing agents are illustrated by various hydroxy acids, as citric acid, which form chelates with the catalyst residues. Surface active agents may be used with advantage. Persons skilled in the art will readily understand that various auxiliary equipment will be required which equipment is not shown. Thus, for example, various storage tanks and make-up tanks may be needed to feed through the system the aqueous base through line 52. Also pumps, heaters, valves, temperature recording apparatus, pressure recording apparatus, and the like may be added to the system wherever needed.

Figure 3:
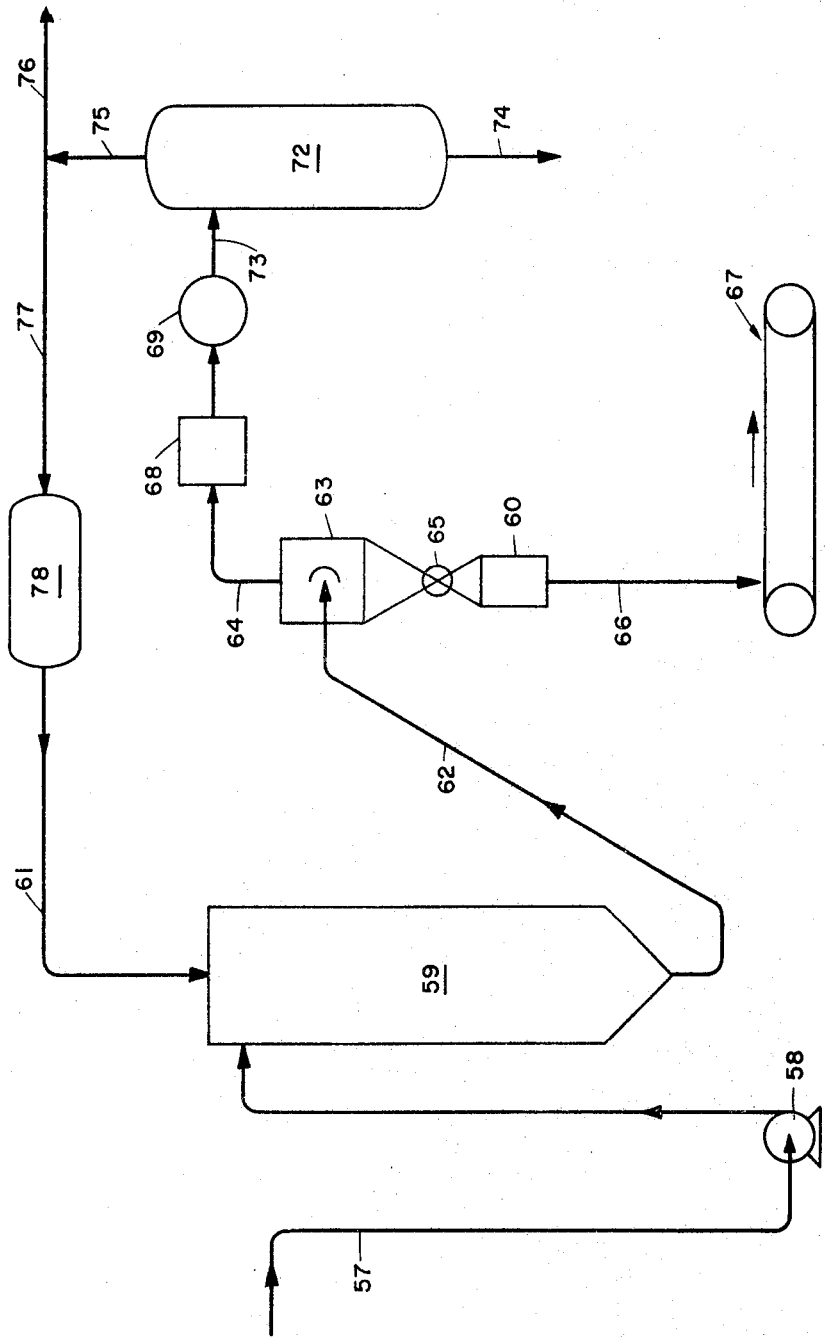
FIG. 3 is a diagrammatic representation of the polymer recovery operations in the same embodiment.

As shown in FIG. 3, the polymer slurry enters the polymer recovery operation from line 57. The polymer is contained in admixture with the hydrocarbon diluent, unreacted gaseous olefin, propane and small amounts of vaporized solvent. Additionally the polymer most often will contain trace amounts of catalyst residues and small amounts of basic materials from the treatment with aqueous base from the washer 51. The mixture conveniently is passed through a pump 58 before entering a spray dryer 59. The spray dryer 59 may be of conventional design modified to meet the requirements of the present processes and, for the purpose of this description the most preferred embodiment is described in greater detail. The polymer slurry is subjected to spray drying whereupon solid polymer falls to the bottom of the dryer 59 and the liquid diluent is vaporized. The vaporization of the diluent is accomplished by causing a pressure drop within the spray dryer 59 while maintaining the internal temperature of the spray dryer 59 at a temperature above the boiling point of the diluent. Thus, for example, the pressure of the polymer slurry in line 57 may be in the order of 200–300 p.s.i.a. and added pressure from pump 58 increases the pressure as it enters the spray dryer 59 to about 400–900 p.s.i.g. In this case pressure drop occurs through a nozzle (not shown) which functions to disperse the slurry in the gas stream. Alternatively other means of dispersing the slurry in the spray dryer 59 into the gas stream may be adopted. One such means may be a centrifugal disc atomizer in which event a high pressure, as that afforded by pump 58, would not be needed. The pressure within the spray dryer 59 is considerably lower, i.e. in the order of about 30–100 p.s.i.a. with about 75 p.s.i.a. being preferred. The pressure drop is accomplished by a combination of the pressure generated by pump 58 and incoming gases from line 61, which is described in more detail hereinafter. The solid polymer leaves the spray dryer 59 through line 62 together with vapors of unreacted monomer, propane, vaporized diluent and small amounts of water vapor. All these travel from the spray dryer 59 through line 62 to a polymer recovery unit. For the purpose of this description the polymer recovery unit comprises a cyclone 63 and vent 60. The polymer is collected, under pressure, in the cyclone 63 and gases are taken from the top of the cyclone 63 through line 64. The polymer passes through an air lock 65 whereby the pressure is reduced to about atmospheric pressure. An inert gas, as nitrogen, may be passed through the vent 60 to sweep out residual gases. The solid polymer then passes through line 66 to line 67 which may be a conveyor for further treatment of the polymer or for packaging.

The gases recovered from the cyclone 63 may pass through filter 68 to separate any polymer dust or particles that may be present. The gases are then conveyed to a partial condenser 69 where some of the diluent is condensed. A separator 72 receives a mixture comprising part liquid and part gaseous mixture incoming from line 73. In the separator 72, the condensable gases are separated from the condensed liquids which are recovered from line 74. The non-condensed gases are passed through line 75 and divided into two streams. One stream removes part of the gas from the system by line 76 and the other stream passes in line 77 to a superheater 78 where the gases are heated before being recirculated to the spray dryer 59. The gases coming in at 61 function to provide heat for vaporizing the incoming liquid medium of the slurry from line 57 and also function as carrier gases for the polymer solids which are recovered from the bottom of the spray dryer 59.

The superheater 78 may be of any conventional design and may be operated at temperatures ranging from about 100° F. to about 300° F. with about 230° F. being preferred. The gases at this stage are normally under slight pressure to provide a driving force into the dryer 59.

A still further simplified and particularly preferred mode of practicing this invention will be illustrated by reference to FIG. 4 of the drawing. Explanation will be made with reference to the polymerization of propylene with a catalyst of the type represented by said patent to Winkler et al. In a continuous polymerization according to this method a liquid feed consisting of propylene mixed with propane is carefully dried and purified to remove undesirable impurities such as acetylenic hydrocarbons, sulfur compounds and the like in equipment not shown. The purified feed stream enters the system through line 101. This feed is combined with a recycle propane-propylene stream from line 102 and passed to vessel 103 which serves as a surge drum for feed to the reactor and to separate liquid and vapor components of the feed. The liquid component passes to reactor 106 through line 105 and the vapor component of the feed including, if desired, hydrogen added through line 108, passes to the reactor through line 109. At the same time, during continuous operation, catalyst is added to the reactor. Suitably the catalyst is added in the form of two separate catalyst components designated for convenience component A and component B. Component A added through line 110 is for example, a slurry of titanium trichloride in a light hydrocarbon such as pentane and component B added through line 111 a solution in a similar hydrocarbon of an aluminum alkyl such as aluminum diethyl chloride. The titanium trichloride in a particularly preferred version is prepared by reduction of titanium tetrachloride with an aluminum alkyl such as aluminum triethyl. The preparation of these catalyst components is described in more detail in said Winkler et al. patent. It is more suitable to use low catalyst concentrations in order to simplify the procedures required to remove or reduce the catalyst residues in the polymer. Amount in the order of 0.5 to 5.0 milligram atoms of titanium per liter of reactor content is suitable with amounts on the low side of this range being preferred. During continuous operation reactor 106 is filled to a substantial part with a slurry of polypropylene and catalyst in hydrocarbon liquid. The reactor may contain suitable agitation such as the gas agitation referred to with respect to FIG. 1 or suitable mechanical agitation to maintain an evenly distributed slurry of polyolefin and catalyst. The temperature is maintained in the reactor at a desired level preferably by evaporative cooling. Vapors are withdrawn from the reactor though line 112, cooled in condenser 113 and passed to surge vessel 103 for return to the reactor. In the preferred modification of propylene polymerization hydrogen is present in the reactor gas and hence the vapors withdrawn from the reactor are not completely condensed. Portions of the circulating vapor stream may be bled off by means not shown to maintain the desired conditions in the reactor.

A portion of the reactor slurry is continuously withdrawn from the reactor via line 114 and passed to catalyst killing vessel 115. Vessel 115 may be identical to catalyst killing vessel 26 described in FIG. 1. The liquid added in killing vessel 115 is preferably an anhydrous alcohol such as ethanol or isopropanol, added via line 116. At the same time there is preferably also added a small proportion of anhydrous acid such as anhydrous HCl via line 118. The combined acid and alcohol pass to the vessel via line 119. In order to achieve the desired degree of removal of residual catalyst components it is preferred to carry out the contact of withdrawn reactor slurry with anhydrous alcohol and acid in two or more vessels in series; thus the intimate mixture of slurry and alcohol is withdrawn to a second vessel 120 which may be identical to vessel 115 and then to similar vessels which are optional. The slurry removed from vessel 120 is combined with water from 123 to serve to wash out the residue of decomposed catalyst and alcohol in the slurry. The washing is carried out in vessel 121. The mixture of slurry and dilute acidic alcohol is then withdrawn to a settling vessel 122 which is in principle the same as settlers 38, 46, and 53 of FIG. 2. As illustrated in FIG. 4 the settling vessel is a vertical vessel equipped with an agitator which has multiple paddles and rotates gently in the upper layer only so as to maintain the solid polymer in suspension in the upper layer which consists of the hydrocarbon diluent from the reactor. The lower layer which consists of dilute aqueous acidic alcohol is withdrawn from the settler via line 124 and the slurry freed in substantial part of catalyst components is withdrawn from the upper layer via line 125. The alcohol layer withdrawn via line 124 may be treated for recovery of the alcohol and reuse thereof. The slurry removed via line 125 is combined with more water from line 126 to serve to wash out the remaining residue of catalyst and alcohol in the slurry. The washing is carried out in vessel 128 provided with suitable agitators 129. The mixture of water and polymer slurry passes via 130 to settler 131 which may be identical to settler 122. In settler 131 an aqueous phase settles to the bottom and is removed via line 132 for possible recovery of remaining alcohol while the purified washed polymer slurry is withdrawn via line 133. If desired, the water wash may be repeated in an additional series of vessels similar to 121, 122, 128 and 131. The final washed slurry passes to a surge vessel 134 which may also serve as a mixing vessel for the addition of inhibitors which it is desired to have in the final polymer, e.g., suitable antioxidants and light stabilizers such as are now well known to be desirable in polyolefins. The inhibitors are added via line 135 and agitation is provided by stirrer 136. The slurry from vessel 134 is then passed via line 138 to dryer 139. This dryer suitably consists of a simple coil of tubing of suitable dimension, heated in a simple steam chest. Such a dryer is described in further detail in a copending application of H. A. Cheney and E. G. Foster, Ser. No. 3,458, filed Jan. 19, 1960, now U.S. Patent No. 3,040,015.

The system for recovery of solid polymer from the dryer effluent is also described in said patent. The effluent leaving the dryer via line 140 consists of a vapor stream of propane, propylene and other vaporized light hydrocarbon liquid, if present, together with finely divided polypropylene powder in suspension. A rough separation between the vapor and powder portions of this stream is made in a first cyclone 141 from which vapor passes via line 142 to a second cyclone 143. The powder portion of the first cyclone passes through a special control valve 144 which permits passage essentially only of powder through line 145 into powder storage vessel 146. Powder from the second cyclone 143 also passes into vessel 146 via line 148. Vaporous propane, propylene and the like, free of polymer, passes via line 149 and 150 to a condenser 152 and accumulator 153. As shown, the vapors in line 150 are compressed by compressor 151 to the required increased pressure. From accumulator 153 any liquid water, separated in the condensation, is withdrawn via line 154 and the hydrocarbon stream is withdrawn via line 156 to dryer 158 and thence via line 102 is returned as recycle to the reactor.

Polypropylene powder, accumulated in vessel 146, passes through control valve 159 to polymer stripper 160 in which a nitrogen stream enters at the bottom via line 161 and passes up through the fluidized solid bed and out via line 162, serving to remove the last traces of hydrocarbon associated with the polymer. The stripped polymer passes via line 163 to storage 164. The polymer can then be worked up in any desired fashion, preferably by being converted into nibs in an extruder. Coloring of the polymer may take place before or after conversion into nibs.

Figure 4:
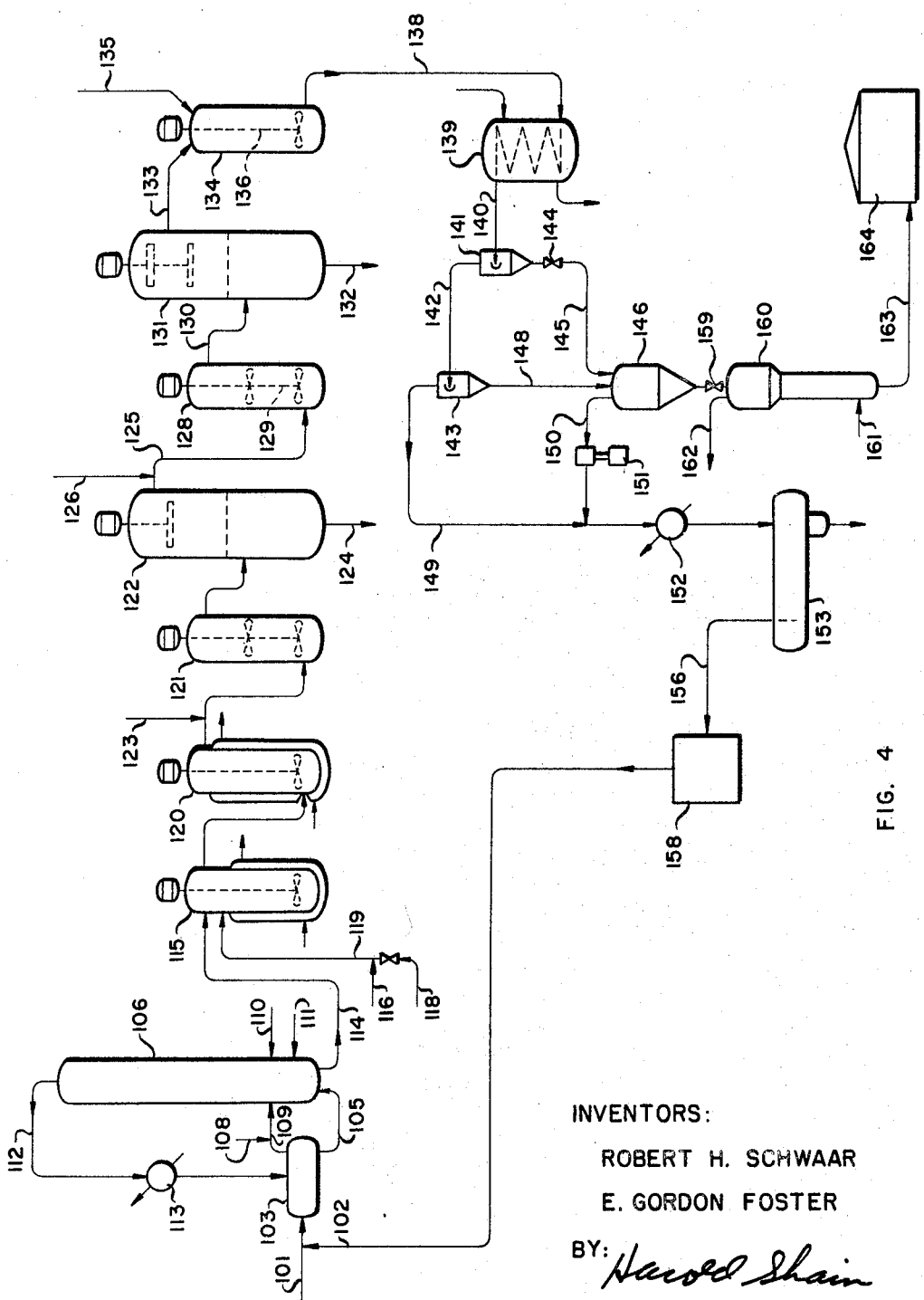
FIG. 4 is a diagrammatic representation of an alternative embodiment of an integrated process.

In the process of FIG. 4, as has been explained, it is preferred to utilize as feed a mixture of liquid propane and propylene suitably having from 25 to 100% propylene. The mixture in the reactor itself contains from 20 to 100% propylene and is maintained at a temperature of about 125° F. and a pressure of about 300 p.s.i.a. Reactor slurry is withdrawn at the same pressure and is heated to about 10° F. above the reaction temperature in catalyst killing vessel 115 where it is in contact with anhydrous acidified alcohol in liquid phase. Since the temperature and pressure in the reactor are designed to maintain cooling by evaporation it is evident that the pressure in vessel 115 must be somewhat higher than in the reactor. This is obtained by a pump, not shown, in line 114. Contact times in vessel 115 and 120 are suitably in the range from 10 to 60 minutes. The wash in vessels 121 and 128 is suitably carried out at a temperature of about 130° F. with a volume of water from 0.5 to 2 based on the slurry. It is preferred to carry out two water washes in series. The completely washed polymer slurry in vessel 134 is essentially identical in constitution, except for the removal of catalyst impurities, to the composition of the slurry in the reactor itself. The slurry passes to the dryer without any substantial change in pressure and there is only a slight pressure drop in the dryer itself. The major proportion of the vapor component of the effluent from the dryer passes directly through lines 140, 142 and 149 to condenser 152 without requiring any further compression. Since it is at a relatively high pressure in excess of 200 p.s.i. this vapor stream, consisting largely of propylene and propane, can be directly condensed by cooling water of ordinary temperature, thus providing a substantial economy in the process.

It will be understood that other types of vessels which fulfill the same functions may be substituted for the specific vessels indicated in the drawing of FIG. 4. It is possible, for example, to substitute for the drying system consisting of vessels 139, 146 and 160 and associated cyclones the spray drying system shown in FIG. 3.

It will also be evident throughout the description of this process that necessary equipment such as pumps, valves and the like, whose location will be obvious to the skilled chemical engineer, have not been shown in order to permit a simplified description.

In reviewing the illustrations of operating the process of this invention, its advantages will be apparent on careful consideration. The major advantage and distinguishing feature of the process is that from the time the polymer slurry leaves the reactor until the dried polymer is separately recovered there is no mechanical separation of polymer solids from the liquid associated therewith. The only separation of polymer solids and the associated liquid ingredient takes place in an evaporative drying step, illustrated by spray dryer 59 in FIG. 3 and the special dryer 139 in FIG. 4. By contrast, in the olefin polymerization process heretofore known laborious mechanical separations of liquid from polymer are required, e.g., by centrifuging, filtration and the like. The polymer has to be redispersed in further portions of liquid and again separated and the drying of polymer having relatively minor portions of liquid is then carried out in devices such as rotary kiln driers.

An advantage which is associated with the operation of this invention is that the pressure throughout the system, from the point at which polymer slurry is withdrawn from the reactor to the point at which dried polymer and olefin and diluent vapor are separately recovered is at a relatively high value. It is a particular advantage that the vapor of residual monomer and diluent is separated from the polymer at a high pressure so that it can be readily condensed with economical means for reuse in the system. The need for expensive recompression equipment is thus avoided.

One of the features which contributes to the operability of the present process is the method of separating polymer slurry from immiscible liquids of different specific gravities used in the washing steps. Thus the slurry separating settlers illustrated by vessels 38, 46 and 53 in FIG. 2 and 122 and 131 in FIG. 4 contribute a unique advantage to the integrated process of this invention.

This invention is described in greater detail in Example I which describes one preferred embodiment of the invention although it will be readily appreciated that various modifications may be adopted. For convenience Example I is described in relation to the drawings.

EXAMPLE I

A propylene feed stream enters the system from line 1 and passes into reactor 4 through line 3. The feed stream contains 25 mole percent propylene, 25 mole percent propane and 50 mole percent of pentane. Simultaneously, catalyst enters the system from lines 6 and 10. In line 6 is fed a mixture of aluminum diethyl chloride and titanium trichloride in a mole ratio of about 3:1 and aluminum diethyl chloride fed through line 10. The total contents of the catalyst components within the reactor are adjusted to be in the mole ratio of aluminum to titanium of about 4:1. At this time valves 2, 9, 13, 16 and 19 are closed and the reactors contain gaseous nitrogen from being purged previously. The rate at which the components are fed into the reactor 4 from lines 3 and 6 will depend largely on the number of reactors that are employed and for the purpose of this example a total of 6 hours of polymerization time is desired. Accordingly the residence time in each reactor should be about 2 hours and the rates of feed are so adjusted. For the purpose of this example 1.75 pounds per hour are fed through line 6 and about 1.48 pounds per hour through line 10, and the total entering through line 3 is about 233 pounds per hour. As the reactor is charged, a valve (not shown) in line 22 is opened. The temperature rises and approaches 185° F. and after about 2 hours reactor 4 is filled. The pressure within the reactor is maintained at about 200 p.s.i.a. by suitable pumping equipment in lines 1, 5 and 10. When the reactor 4 is filled valves 2 and 9 are open and the disintegrator 6A is put in operation. Polymer slurry passes to reactor 12 from reactor 4 by line 11 and at this time a valve (not shown) in line 23 is opened. The slurry at this time has a concentration of about 5%, by weight, of solids. The flow in lines 11 and 14 are adjusted so that reactor 12 fills in about 2 hours. The temperature within the reactor 12 reaches about 185° F. and is maintained at this temperature throughout the polymerization. The pressure is also maintained at about 200 p.s.i.a. When the reactor 12 is filled the disintegrator 7A is placed in operation and valves 13 and 16 are opened and reactor 15 is permited to fill in about 2 hours. A valve (not shown) in line 24 is opened. The slurry coming to reactor 15 through line 18 has a solids content of about 10% by weight. At the end of the third two-hour period the temperature within the reactor is very nearly 185° F. and the pressure is about 200 p.s.i.a. As this operation continues from the startup the temperatures within the reactors 4, 12 and 15 reach 185° F. During the operation of the three reactors, lines 22, 23 and 24 are open so that most of the unreacted propylene is vented together with most of the propane and smaller amounts of vaporized pentane. A portion of these vent gases is circulated back to the reactors 4, 12 and 15 through lines 20a and 20b and 20c, respectively, to provide agitation.

When the last reactor 15 is filled valve 19 is opened and the disintegrator 8A is started. The slurry, containing about 15% by weight of solids, is fed through line 21 at the rate of about 178 pounds per hour to the vessel 26 and as the vessel 26 is filled with the slurry from line 21, anhydrous isopropanol is fed through line 29 with the valve 30 being closed. The alcohol is fed at the rate of about 0.01 gallon per minute. The agitator 27 is started and cooling water is circulated through the jacket 28. When vessel 26 is nearly filled a valve (not shown) in line 32 is opened and the contents of the vessel 26 are withdrawn at about the same rate at which the vessel 26 is fed from lines 21 and 29. The pressure without the vessel 26 is maintained at about 200 p.s.i.a. and the temperature is in the order of about 140° F. with minor fluctuations both in temperature and pressure being noted. The alcohol-pentane-polypropylene slurry is fed to a wash vessel 33 by line 34 which is connected to a feed for the addition of dilute hydrochloric acid through line 35. The hydrochloric acid is 0.22%, by weight, of hydrogen chloride and is fed into line 34 at the rate of 120 pounds per hour. A pump (not shown) in line 35 delivers about 220 p.s.i. and in this way the pressure in vessel 33 is maintained in the order of about 200 p.s.i.a. The temperature is somewhat less than in the vessel 26 and no effort is made to control the temperature. The vessel 33 is agitated with a 3-blade agitator supported on a single shaft and when the vessel is filled the contents are conveyed through line 37 to a settler that is horizontally disposed and is diagrammatically shown in FIG. 2 by 38.

As the contents of line 37 enters the settler 38 some turbulence takes place but when the inlet of line 37 is covered the turbulence decreases greatly and two layers are formed whereupon the agitator 39 is started to provide gentle agitation of the upper layer. When the settler 38 is filled line 41 is open so that the aqueous lower layer slowly drains and a valve (not shown) is used to adjust the outgoing flow. The upper layer, which is the polymer slurry layer, is driven out by pressure through line 42 and then to wash vessel 43. Warm water at about 150° F. is fed to vessel 43 at the rate of about 120 pounds per hour and is under about 200 p.s.i. pressure. In this case the reactor 43 is equipped with an agitator and it is placed in motion as the vessel is filled. The overflow from vessel 43 proceeds by line 45 to the settler 46 which is of identical design and construction as settler 38 whereat substantially the same mechanical procedures are adopted. The temperature within settler 46 is about 130° F. but no attempt is made at temperature control.

The upper layer from the settler 46 is then conveyed by line 48 to a wash vessel 51 where the polymer slurry is washed with a dilute solution of sodium carbonate. The sodium carbonate enters the vessel 51 through line 52 at the rate of about .005 gallon per minute and the sodium carbonate solution is about 0.5%, by weight and is under pressure of about 200 p.s.i. The vessel 51 is equipped with an agitator (not shown) which achieves intimate mixture between the incoming slurry and the aqueous sodium carbonate. When the wash vessel 51 is filled slurry passes by line 54 to another settler 53. The settler 53 is of the same design and operates in the same manner as settlers 46 and 38. Spent aqueous sodium carbonate is withdrawn from line 56.

In FIG. 3 the polymer slurry, under pressure, is driven through line 57 and passes through pump 58 which is a feed pump to the spray dryer 59. At the start of the operations heated propane enters the spray dryer 59 through line 61 from an external source (not shown) and in this way the feed stream entering the spray dryer 59 is processed at elevated temperatures in the order of about 200° F. The incoming polypropylene slurry, being under pressure of about 200 p.s.i.a in line 57 and with added pressure afforded by the pump 58, is under pressure in the order of about 700 to 800 p.s.i.g., which pressure will fluctuate somewhat. Solid polymer is recovered in the form of a fine powder in the spray dryer 59 and is driven to a cyclone 63 where the polymer is separated from the gases. The gases are passed through line 64, through a filter 68 and then recovered in the partial condenser 69, separator 72 and then returned to the spray dryer after passing through superheater 78 which heats the gases to about 250° F. The supply of heated propane used at the start of the spray drying operation is then cut off and not used further. The polymer passes through an air-lock 65 and ultimately on the conveyer 67. Nitrogen is passed through the vent 60 to drive off residual gases and the vented gases are flared. The recovered polypropylene is 96% insoluble in boiling heptane after 60 minutes and this polymer has an intrinsic viscosity of 8.6 measured in decalin at 125° C.

It will be found that by the time the initial polymer stream enters the unit for catalyst decomposition, shown in FIG. 2, the reactors 4, 12 and 15 will be operating at substantially constant temperatures and pressures as equilibrium is established. Similarly, equilibrium will be established in the units shown in FIG. 2 at the time the spray drying operation is underway and depending upon the experience of operating personnel the entire process can be placed in operation and equilibrium established in all the units in about 12 hours. Once the system is started and equilibrium established in all of the units, the process proceeds smoothly and efficiently. It should be noted that the polymerization reactors 4, 12 and 15 and the spray dryer 59, together with their respective inlets, outlets, pumps, valves and the like are points in the process that are particularly susceptible to fouling and considerable caution in these operations should be exercised. The above example describes operating procedures that will act as a guide is starting up the unit as well as operating it continuously. Variations in the operating conditions set forth may be undertaken but it should be realized that variations in any respect may require compensating variations in the system.

EXAMPLE II

The procedures of Example I are repeated in all respects except that the propylene feed entering the system at 1 contains 2 mole percent of hydrogen. The polymer that is recovered has an intrinsic viscosity of 4.4 and a crystallinity of about 93% determined by boiling a polymer sample in heptane for 60 minutes.

EXAMPLE III

The procedure of Example I is followed using the same apparatus except that ethylene is polymerized. For this example the feed stream contained ethane instead of propane. In addition the catalyst is prepared from aluminum triethyl and titanium tetrachloride in a mole ratio of about 2.5:1. The catalyst is fed in through line 5 and line 10 is not in operation. The polymerization is conducted, at equilibrium temperatures, within the reactors 4, 12 and 15 at about 135° F. and at pressure of about 200 p.s.i.a. The treatment of the polymer to remove catalyst residues is substantially the same as in Example I and the spray drying of the polymer slurry is conducted at temperatures in the order of about 150° F. and at pressures of about 600 p.s.i.g. for the incoming polyethylene slurry. The pressure within the spray drying chamber during the spray drying operation is about 50 p.s.i.a.

From the foregoing description of the processes of this invention it will be seen that the many variations in the catalyst choice, operating temperature and pressures, and the like, may be adopted as will be understood by persons skilled in the art.

We claim as our invention:

1. A continuous process for the polymerization of propylene in which the monomer is continuously polymerized in liquid phase in the presence of a liquid, normally gaseous hydrocarbon diluent and of a catalyst comprising the reaction product of titanium trichloride and an aluminum alkyl compound, said process comprising the steps of
   (a) continuously charging to a polymerization zone feed in which the polymerizable constituent consists essentially of propylene;
   (b) carrying out the polymerization reaction therein in the presence of said catalyst and diluent at a temperature in the range from 90° F. to about 200° F. and a pressure in the range from about 50 to 500 p.s.i.a. to produce propylene polymer containing 93–96% of polymer which is insoluble in boiling heptane;
   (c) continuously withdrawing polymer slurry from the polymerization zone;
   (d) contacting the total withdrawn slurry with a polar organic catalyst-deactivating liquid comprising essentially an alkanol of 1 to 4 carbon atoms per molecule;
   (e) thereafter contacting the resulting slurry in at least one wash step with water;
   (f) separating the total slurry from aqueous wash liquid in a liquid-liquid separation step after each of said wash steps, said contacts and separations being carried out in continuous flow at a temperature in the range from 50° to 200° F. and a pressure in the range from 50 to 500 p.s.i.a., said temperatures and pressures being selected such that solid polymer remains in the solid phase and the liquid portion of the mixture remains in the liquid phase, and that the pressure in process steps (c), (d), (e) and (f) is maintained at a value at least about as high as the pressure in said polymerization zone;
   (g) continuously passing the total washed slurry, consisting of substantially all liquid and polymer originally removed from the polymerization zone, to a drying step in which all liquid is removed by evaporation at an elevated pressure from the solid polymer with not deliberately induced change in pressure;
   (h) continuously recovering solid polypropylene from said drying step; and
   (i) continuously condensing the evaporated liquid recovered from said drying step, removing water therefrom, and recycling resulting hydrocarbon liquid to said polymerization zone.

2. A process according to claim 1 in which the range of pressures recited in subparagraphs (b) and (f) is from about 200 to about 300 p.s.i.a.

3. A process according to claim 1 wherein said normally gaseous hydrocarbon diluent is an alkane and said feed contains propylene as sole polymerizable constituent.

4. A process according to claim 1 in which said catalyst deactivating liquid is an anhydrous acidified alkanol.

5. A process according to claim 1 in which a small controlled amount of hydrogen is charged to said polymerization zone.

6. A process according to claim 1 in which each liquid-liquid separation step according to subparagraph (f) the mixture is settled into an upper hydrocarbon slurry layer and a lower aqueous layer, the upper layer is continuously agitated to maintain polymer in substantially uniform suspension therein, and portions of slurry are continuously withdrawn from said upper layer.

7. A continuous process for the polymerization of propylene in which the monomer is continuously polymerized in liquid phase in the presence of a liquid, normally gaseous hydrocarbon diluent and of a catalyst comprising the reaction product of titanium trichloride and an aluminum alkyl compound, said process comprising the steps of
   (a) continuously charging to a polymerization zone feed in which the polymerizable constituent consists essentially of propylene;
   (b) carrying out the polymerization reaction therein in the presence of said catalyst and diluent at a temperature in the range from 90° F. to about 200° F. and a pressure in the range from about 50 to about 500 p.s.i.a. to produce propylene polymer containing about 93% of polymer which is insoluble in boiling heptane;
   (c) continuously withdrawing polymer slurry from the polymerization zone;
   (d) contacting the total withdrawn slurry with a polar organic catalyst-deactivating liquid comprising essentially an alkanol of 1 to 4 carbon atoms per molecule;
   (e) thereafter contacting the resulting slurry in at least one wash step with water;
   (f) separating the total slurry from aqueous wash liquid in a liquid-liquid separation step after each of said wash steps, said contacts and separations being carried out in continuous flow at a temperature in the range from 50° to 200° F. and a pressure in the range from 50 to 500 p.s.i.a., said temperatures and pressures being selected such that solid polymer remains in the solid phase and the liquid portion of the mixture remains in the liquid phase, and that the pressure in process steps (c), (d), (e) and (f) is maintained at a value at least about as high as the pressure in said polymerization zone;

(g) continuously passing the total washed slurry, consisting of substantially all liquid and polymer originally removed from the polymerization zone, to a drying step in which all liquid is removed by evaporation at an elevated pressure from the solid polymer with no deliberately induced change in pressure;

(h) continuously recovering solid polypropylene from said drying step; and (i) continuously condensing the evaporated liquid recovered from said drying step, removing water therefrom, and recycling resulting hydrocarbon liquid to said polymerization zone.

8. A process according to claim 7 wherein said normally gaseous hydrocarbon diluent is an alkane and said feed contains propylene as sole polymerizable constituent.

9. A process according to claim 7 in which a small, controlled amount of hydrogen is charged to said polymerization zone.

10. A continuous process for the polymerization of propylene in which the monomer is continuously polymerized in liquid phase in the presence of a liquid, normally gaseous alkane diluent and of a catalyst comprising the reaction product of titanium trichloride and an aluminum alkyl compound, said process comprising the steps of (a) continuously charging a feed comprising propylene as sole polymerizable constituent to a polymerization zone;

(b) carrying out the polymerization reaction therein in the presence of said catalyst and diluent at a temperature in the range from 90° F to about 200° F. and a pressure in the range from about 50 to about 500 p.s.i.a. to produce polypropylene containing about 96% of polymer which is insoluble in boiling heptane;

(c) continuously withdrawing polymer slurry from the polymerization zone;

(d) contacting the total withdrawn slurry with a polar organic catalyst-deactivating liquid comprising essentially an alkanol of 1 to 4 carbon atoms per molecule;

(e) thereafter contacting the resulting slurry in at least one wash step with water;

(f) separating the total slurry from aqueous wash liquid in a liquid-liquid separation step after each of said wash steps, said contacts and separations being carried out in continuous flow at a temperature in the range from 50° to 200° F. and a pressure in the range from 50 to 500 p.s.i.a., said temperatures and pressures being selected such that solid polymer remains in the solid phase and the liquid portion of the mixture remains in the liquid phase, and that the pressure in process steps (c), (d), (e) and (f) is maintained at a value at least about as high as the pressure in said polymerization zone;

(g) continuously passing the total washed slurry, consisting of substantially all liquid and polymer originally removed from the polymerization zone, to a drying step in which all liquid is removed by evaporation at an elevated pressure from the solid polymer with no deliberately induced change in pressure;

(h) continuously recovering solid polypropylene from said drying step; and (i) continuously condensing the evaporated liquid recovered from said drying step, removing water therefrom, and recycling resulting hydrocarbon liquid to said polymerization zone.

References Cited

UNITED STATES PATENTS

| 2,949,447 | 8/1960 | Hawkins et al. |
| 2,980,660 | 4/1961 | Ralls. |
| 3,066,130 | 11/1962 | Grundmann et al. |
| 3,296,238 | 1/1967 | Van Der Plas. |

JAMES A. SEIDLECK, Primary Examiner

U.S. Cl. X.R.

260—94.9